(12) United States Patent
Hisatomi et al.

(10) Patent No.: US 7,697,152 B2
(45) Date of Patent: Apr. 13, 2010

(54) PRINT CONTENT TRANSMISSION DEVICE, PRINT DEVICE, AND PRINT SYSTEM

(75) Inventors: Kenji Hisatomi, Hirakata (JP); Kazuyuki Murata, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 1004 days.

(21) Appl. No.: 10/541,220

(22) PCT Filed: Mar. 26, 2004

(86) PCT No.: PCT/JP2004/004322

§ 371 (c)(1),
(2), (4) Date: Jun. 30, 2005

(87) PCT Pub. No.: WO2004/088499

PCT Pub. Date: Oct. 14, 2004

(65) Prior Publication Data

US 2006/0120786 A1    Jun. 8, 2006

(30) Foreign Application Priority Data

Mar. 28, 2003 (JP) ............................ 2003-092489

(51) Int. Cl.
*G06F 15/00* (2006.01)
(52) U.S. Cl. .................. 358/1.15; 358/1.2; 358/1.6; 358/1.9; 358/2.1; 715/205; 715/233; 715/234; 715/277
(58) Field of Classification Search ............... 358/1.15, 358/1.2, 1.6, 1.9, 2.1; 715/205, 233, 234, 715/277
See application file for complete search history.

(56) References Cited

U.S. PATENT DOCUMENTS 5,991,514 A * 11/1999 Nielsen ................... 358/1.14

(Continued)

FOREIGN PATENT DOCUMENTS

EP    1 133 170    9/2001

(Continued)

OTHER PUBLICATIONS

Machine translation of WO 03/019348 to Hisatomi, dated Mar. 6, 2003.*

(Continued)

*Primary Examiner*—David K Moore
*Assistant Examiner*—Mark R Milia
(74) *Attorney, Agent, or Firm*—Wenderoth, Lind & Ponack, L.L.P.

(57) ABSTRACT

In a print system, without requiring a standardized command indicating use of a thumbnail image, and without causing an abnormal operation, a print content transmission device directs a print device to use the thumbnail image, wherein print content is described using XML format, and a direction command is described using XML format in the print content. Specifically, in a step S201, a processing control unit (111) proceeds to a step S202 in the case where there is input from a user I/F unit. In the step S202, a unique information addition unit (104) judges whether or not the thumbnail image should be used for printing. In the case where it is judged that the thumbnail image should be used (S202: Yes), the unique information addition unit (104) directs a print content generation unit (108) to add, to the print content, a direction to use the thumbnail image (step S203).

24 Claims, 18 Drawing Sheets

U.S. PATENT DOCUMENTS

| | | |
|---|---|---|
| 6,185,588 B1 * | 2/2001 | Olson-Williams et al. ... 715/236 |
| 6,351,317 B1 * | 2/2002 | Sasaki et al. ................ 358/1.15 |
| 6,714,209 B2 * | 3/2004 | Van Valer ..................... 345/629 |
| 6,715,003 B1 * | 3/2004 | Safai ............................. 710/33 |
| 6,983,415 B2 * | 1/2006 | Shima ......................... 715/200 |
| 7,062,705 B1 * | 6/2006 | Kirkwood et al. ........... 715/205 |
| 7,107,516 B1 * | 9/2006 | Anderson et al. ........... 715/210 |
| 7,142,318 B2 * | 11/2006 | Lopez et al. ................ 358/1.15 |
| 2002/0054324 A1 * | 5/2002 | Okada et al. ................ 358/1.15 |
| 2002/0129065 A1 * | 9/2002 | Shiohara ..................... 707/513 |
| 2002/0171857 A1 | 11/2002 | Hisatomi et al. |
| 2003/0014416 A1 | 1/2003 | Kimbell et al. |
| 2003/0177248 A1 * | 9/2003 | Brown et al. ................ 709/229 |
| 2006/0120786 A1 | 6/2006 | Hisatomi et al. |

FOREIGN PATENT DOCUMENTS

| | | |
|---|---|---|
| JP | 2000-267829 | 9/2000 |
| JP | 2001-195208 | 7/2001 |
| JP | 2002-091726 | 3/2002 |
| JP | 2002-229752 | 8/2002 |
| JP | 2002-334294 | 11/2002 |
| JP | 2003-036152 | 2/2003 |
| JP | 2003-037763 | 2/2003 |
| JP | 3761554 | 1/2006 |

OTHER PUBLICATIONS

Supplementary European Search Report issued Dec. 22, 2008 in corresponding European Application No. 04 72 3773.

* cited by examiner

FIG. 4A honbun_xhtml

```
<?xml version="1.0" encoding="EUC_JP"?>
<?xhtml xhtml-version="1.0"?>
<xhtml>
<body>

<object data="./mobile1.jpg" type="image/jpeg" style="width:12mm;height:16mm">
</object>

<object data="./mobile2.jpg" type="image/jpeg" style="width:12mm;height:16mm">
</object>

<p>
The last day of the 58th national sports festival winter Asia meet was held on the 29th, and there were 3 events respectively in Ikaho town, Maebashi city and Takasaki city in Gumma prefecture. Nagano won the championships in both of the basketball men and women all-around (Emperor's Cup) and the basketball women all-around (Emperess's Cup). In soccer, Chiba ranked No. 1, Fukuoka No. 2...abbreviation...
</p>

</body>
</xhtml>
```

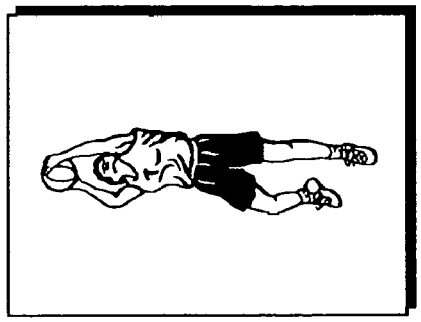

FIG. 4B
mobile1.jpg

FIG. 4C
mobile2.jpg

FIG. 5B
mobile1.jpg

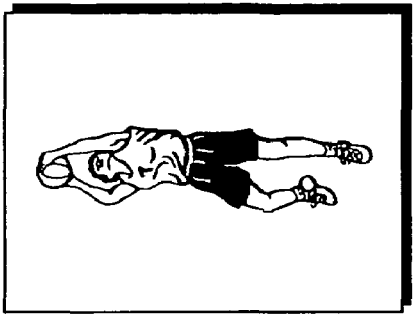

FIG. 5C
mobile2.jpg

FIG. 5A honbun_xhtml

```
<?xml version="1.0" encoding="EUC_JP"?>
<?xhtml xhtml-version="1.0"?>
<xhtml>
<body>

<object data="./mobile1.jpg" type="image/jpeg" style="width:12mm;height:16mm">
<param name="imagepriority" value="thumbnail" valuetype="data"></param>
</object>

<object data="./mobile2.jpg" type="image/jpeg" style="width:12mm;height:16mm">
<param name="imagepriority" value="thumbnail" valuetype="data"></param>
</object>

<p>
The last day of the 58th national sports festival winter Asia meet was held on the 29th, and there were 3 events respectively in Ikaho town, Maebashi city and Takasaki city in Gumma prefecture. Nagano won the championships in both of the basketball men and women all-around (Emperor's Cup) and the basketball women all-around (Emperess's Cup). In soccer, Chiba ranked No. 1, Fukuoka No. 1, Fukuoka No. 2...abbreviation....
</p>

</body>
</xhtml>
```

FIG. 9

```
<?xml version="1.0" encoding="EUC_JP"?>
<?xhtml xhtml-version="1.0"?>
<xhtml>
<body>

<object data="./mobile1.jpg" type="image/jpeg" style="width:12mm;height:16mm">
<param name="imagepriority" value="thumbnail" valuetype="data"></param>
</object>

<object data="./mobile2.jpg" type="image/jpeg" style="width:12mm;height:16mm">
<param name="imagepriority" value="thumbnail" valuetype="data"></param>
</object>

<p>
The last day of the 58th national sports festival winter Asia meet was held on the 29th, and there were 3 events respectively in Ikaho town, Maebashi city and Takasaki city in Gumma prefecture. Nagano won the championships in both of the basketball men and women all-around (Emperor's Cup) and the basketball women all-around (Emperess's Cup). In soccer, Chiba ranked No. 1, Fukuoka No. 2...abbreviation...
</p>

</body>
</xhtml>
```

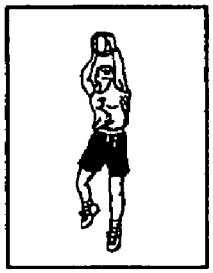 

The last day of the 58$^{th}$ national sports festival winter Asia meet was held on the 29$^{th}$, and there were 3 events respectively in Ikaho town, Maebashi city and Takasaki city in Gumma prefecture. Nagano won the championships in both of the basketball men and women all-around (Emperor's Cup) and the basketball women all-around (Emperess's Cup). In soccer, Chiba ranked No. 1, Fukuoka No. 2...abbreviation...

FIG. 15A form_a.xhtml

```
<?xml version="1.0" encoding="EUC_JP"?>
<?xhtml xhtml-version="1.0"?>
<xhtml>
<head>
<meta name="display-target" content="screen"/>
</head>
<body>
<p>
   Purchase questionnaire
</p>
<form>
<textarea rows=1 cols=20>
Please describe opinions and comments here. To make an inquiry,
please call to the following number. 06-5555-XXXX(representative)
</textarea>
</form>
</body>
</xhtml>
```

FIG. 15B form_b.xhtml

```
<?xml version="1.0" encoding="EUC_JP"?>
<?xhtml xhtml-version="1.0"?>
<xhtml>
<head>
<meta name="display-target" content="print"/>
</head>
<body>
<p>
   Purchase questionnaire
</p>
<form>
<textarea rows=1 cols=20>
Please describe opinions and comments here. To make an inquiry,
please call to the following number. 06-5555-XXXX(representative)
</textarea>
</form>
</body>
</xhtml>
```

Display limited content

Print specific content

FIG. 18A

| Special tag attributes | Attribute meaning | Attribute value |
|---|---|---|
| colorspace | Color space of image | hc_srgb, hc_709, pt_srgb |
| content-width, content-height | Dot width/height of image | 80px , 45px |

FIG. 18B

| Meta information name | Value | Meaning |
|---|---|---|
| content-kind | unknown | Content kind unidentified |
| | photo-print | Picture |
| | webxhtml-print | Web page (xhtm-print version) |
| | webcopy-print | Web page (display copy format version) |
| | tnavi-print | T navigation content |
| | bmlcopy-print | BML display copy |
| | bmlxhtml-print | Print specific content via broadcast |
| | screen-shot | Screen shot image of moving picture |

PRINT CONTENT TRANSMISSION DEVICE, PRINT DEVICE, AND PRINT SYSTEM

BACKGROUND OF THE INVENTION

1. Field of Invention

The present invention relates to a print content transmission device which transmits, to a print device, print content including image data generated and compressed based on images photographed by an electronic image device and the like such as a digital still camera. The present invention also relates to a print device and the like which receive and properly rasterize the print content, and then output the print content including the images.

2. Description of the Related Art

In recent years, digital still cameras (also called "electronic still cameras") have been widely used. Digital still cameras, as described above, (i) photoelectrically convert, into an electric signal, an object image-formed by an optical lens, (ii) generate image data compressed using Joint Photographic Experts Group (JPEG) method and the like based on the electric signal, and (iii) record the generated image data into card media such as a PC card and a SD card, or recording media such as a built-in fixed memory. Also, there is a printer which prints images onto paper media and the like, using the image data generated by the above mentioned digital still camera and the like.

Header information based on an Exchangeable Image File Format (Exif) standard is usually assigned to the image data generated, using JPEG method and the like, by a conventional general digital still camera and the like. In the header information, a type of the digital still camera used for generating the image data, photographic conditions when photographing, and the like are described.

Also, in many cases, thumbnail images which have less resolution than main images are simultaneously generated and held.

For example, Japanese Laid-Open Patent application No. 2000-267829 suggests a system that enables selecting which resolution of the images should be used for printing in the case where the above mentioned images having a plurality of resolutions are held. In the above mentioned system, when printing image data of JPEG format made up of main images and small thumbnail images, it can be directed to form print image data using the thumbnail images. Therefore, the main images, which have high resolution (that is, large size), are not unnecessarily handled. Thus, memory efficiency is improved, and time required for printing can be shortened.

In addition, the above mentioned system has a structure in which (i) certain print image data is stored per different resolution, and (ii) print image data having a resolution that corresponds to a print quality specified in a Personal Computer (PC) is selected, adjusted to a predetermined format, and outputted to a print device, in a case where there is the above mentioned print image data in the document which is directed to be printed by the above mentioned application program.

However, in the system disclosed in the above mentioned Japanese Laid-Open Patent application No. 2000-267829, it is the device driver in the PC that generates print image data, and it is the device driver in the same PC to which the user or application notifies "use of thumbnail image". Thus, as long as a command for notifying the "use of thumbnail image" is interpreted by the device driver, the class of commands can be specified uniquely by each manufacturer. Generally, according to this concept, it is not considered that there is a case where the above mentioned command is transmitted to a device driver of another manufacturer.

However, in a case of a print system made up of a Set Top Box (STB) and a printer, it is difficult to employ a method used on PC to install a device driver for each printer type on the STB side. That is because unlike the PC in which an Operating System (OS) of de facto standard is installed, each type of STB has a different type of OS. And, it is very complex to develop a device driver of a printer according to the above mentioned OS.

In such case as described above, it is necessary to exchange a command notifying the "use of thumbnail image" between the STB and an external device such as a printer. However, in the case where the command is uniquely defined, when an external device and the like of another manufacturer, which cannot understand the unique command, receive the unique command, an abnormal operation might be caused. In order to prevent such abnormal operation, it is necessary to standardize the command specification between manufacturers. It is time-consuming to standardize the command between the manufacturers, and the command that can be standardized tends to be limited within the range that can be allowed by each manufacturer.

An object of the present invention, in view of the above mentioned problems, is to provide a print system, a print device and the like in which a print content transmission device can direct a print device to use thumbnail images without requiring a standardized command indicating the use of thumbnail image and without causing an abnormal operation.

BRIEF SUMMARY OF THE INVENTION

In order to achieve the above mentioned object, in the print system according to the present invention, an image is not transmitted as a single image of JPEG format, but as a part of content described based on Extensible Markup Language (XML) specification. In addition, a "direction to use thumbnail image" is described in the content using a tag based on the XML specification. In the XML, there is a rule that "in the case where there are unidentified tag and attribute, the user agent (printer and the like) must ignore the whole definition (that is, the attribute and the value) of the tag and attribute". In the present system 10, as long as it is standardized that the content should be described based on the XML, a command to use thumbnail and the like need not be standardized. This is because another manufacturer's printer based on the XML specification must ignore the command to "use thumbnail image" that the printer cannot identify. Thus, an abnormal operation can be prevented.

In other words, the print content transmission device according to the present invention transmits print content to a print device, including: a content procurement unit operable to obtain or generate print content described complying with a predetermined markup language; a feature identification unit operable to identify a feature of the obtained or generated print content; an addition unit operable to describe the identified feature as a definition statement including a uniquely defined tag which can be handled in the markup language, and to add the definition statement to the print content; and a transmission unit operable to transmit the added print content to the print device.

Moreover, the print device according to the present invention includes: a reception unit operable to receive print content described complying with a predetermined markup language; an extraction unit operable to extract, from the received print content, a definition statement including a uniquely defined tag which can be handled in the markup language; and a print unit operable to generate print image data based on the extracted definition statement, and to execute printing using the print image data.

Thus, without requiring the standardized command indicating the use of the thumbnail image, and without causing the abnormal operation, the print content transmission device can transmit, to the print device, the print content including the direction to use the thumbnail image. And, the print device can execute printing using the thumbnail image based on the direction included in the received print content.

The present invention cannot only be realized as the print content transmission device or the print device, but also as a print system including the print content transmission device and the print device.

Furthermore, the present invention can be realized as a print content transmission method or a print method having the components of the print content transmission device and the print device as steps. And, the present invention can be realized as a program including all of the steps or as a computer-readable storage medium which stores the program.

The print content transmission device according to the present invention additionally describes, in the print content, the definition statement including the uniquely defined tag which indicates the feature of the print content (for example, that the thumbnail image should be used), the print content being described based on the predetermined markup language. Thus, without requiring a standardized command indicating the use of the thumbnail image, and without causing the abnormal operation, the print content transmission device can direct the print device to use the thumbnail image.

Also, in the print system according to the present invention, the image is not transmitted only as the JPEG image, but as the content described using the XML format. And, the "direction to use thumbnail image" is described in the content using the tag based on the XML specification. Thereby, the printer, which can interpret the "direction to use thumbnail image," generates the print image data using the thumbnail image. And, the printing can be completed faster than the case where the print image data is generated using the main image.

Also, even in the case where the content described using the XML format is transmitted to another manufacturer's printer which is based on the XML specification, but cannot interpret the "direction to use thumbnail image", the printer that has received the content ignores the description indicating the direction. Thus, the abnormal operation can be prevented.

In addition, by describing information in the content described using the XML format, the information indicating whether the print content is (i) print content whose display details are to be printed or (ii) the print specific content, the print result can be selected.

Furthermore, even in the case where the print content in which the "XML description indicating the kind of the print content" is described is transmitted to another manufacturer's printer that is based on the XML specification, but cannot interpret the "XML description indicating the kind of the print content", another manufacture's printer ignores the "XML description indicating the kind of the print content". Thus, the abnormal operation can be prevented.

BRIEF DESCRIPTION OF DRAWINGS

FIG. 4A is a diagram showing a structure example of print content;

FIG. 4B is an example of an image file described in the print content;

FIG. 4C is an example of an image file described in the print content;

FIG. 5A is a diagram showing a structure example of print content to which "direction to use thumbnail image" is added;

FIG. 5B is an example of an image file described in the print content as shown in FIG. 5A;

FIG. 5C is an example of the image file described in the print content as shown in FIG. 5A;

FIG. 9 is a diagram showing a situation when another manufacturer's printer interprets the print content as shown in FIG. 5A, FIG. 10 is a diagram showing an example of a print result in another manufacturer's printer;

FIG. 15A is a diagram showing a print content example to which "display limited content" according to the second embodiment is additionally described;

FIG. 15B is a diagram showing a print content example to which "print specific content" according to the second embodiment is additionally described;

FIG. 18A is a diagram showing an example of special tag attributes; and

FIG. 18B is a diagram showing an example of meta information name for specifying a content kind.

DETAILED DESCRIPTION OF THE INVENTION

Figure 1:
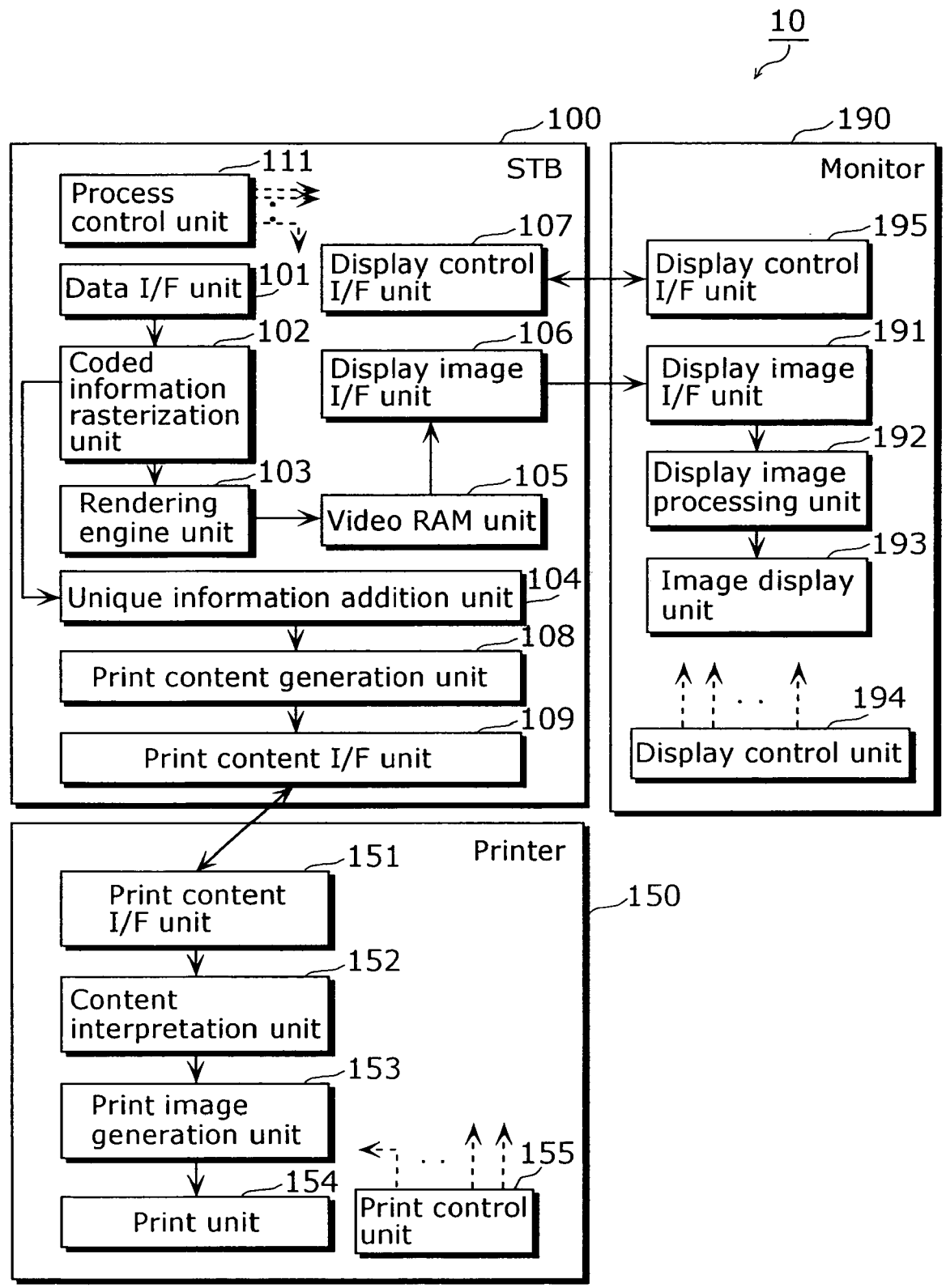
FIG. 1 is a block diagram showing a functional structure of an image processing system according to the first embodiment.

The embodiments according to the present invention will be explained in detail referring to the drawings as follows. Although the present invention will be explained using the drawings in the following embodiments, the present invention is not limited to these embodiments.

First Embodiment

FIG. 1 is a block diagram showing a functional structure of an image processing system 10 according to the first embodiment. The present image processing system 10 (also called "print system") which enables printing based on print content described according to Extensible Markup Language (XML) specification, in particular, printing using "direction to use thumbnail image" described using the XML format.

In the present embodiment, an STB 100 is raised as an example of a device which outputs print content to a printer.

However, such outputting device is not limited to an STB, and may be a digital TV (DTV) in which an STB is built, or a device which realizes a function of STB using other devices such as a digital camera and a Personal Digital Assistant (PDA).

As shown in FIG. 1, the present system 10 includes: the STB 100; a monitor 190; and a printer 150.

The STB 100 (i) converts, into a predetermined format, broadcast content including image data received via antenna (not shown in the drawing) and the like, and (ii) transmits the content to the printer and monitor. The STB 100 includes: a process control unit 111; a data interface (hereinafter referred to as "I/F") unit 101; a coded information rasterization unit 102; a rendering engine unit 103; a unique information addition unit 104; a video Random Access Memory (RAM) unit 105; a display image I/F unit 106; a display control I/F unit 107; a print content generation unit 108; and a print content I/F unit 109.

For example, the process control unit 111 is a micro computer including a RAM and a Read Only Memory (ROM), and controls each unit of the STB 100.

The data I/F unit 101 executes a predetermined process on broadcast content received via the above mentioned antenna and the like, and outputs the content to the coded information rasterization unit 102.

The coded information rasterization unit 102 receives, from the data I/F unit 101, broadcast content including data of eXtensible Hyper Text Markup Language (XHTML) format, data of Moving Picture Experts Group (MPEG) format or data of Broadcast Markup Language (BML) format. Moreover, the coded information rasterization unit 102 (i) executes, on each data included in the received broadcast content, a decoding process corresponding to each data format, and (ii) extracts data indicating control direction to the STB 100 and image data. The process control unit 111 transmits, to the rendering engine unit 103, data which should be displayed in the monitor 190 among the data extracted in the coded information rasterization unit 102.

The rendering engine unit 103 stores the data received from the coded information rasterization unit 102, as image data, into the video RAM unit 105. The video RAM unit 105 outputs the stored image data to the display image I/F unit 106. The display image I/F unit 106 exchanges data which should be displayed, control data and the like with the display image I/F unit 191 in the monitor 190.

Also, although not shown in FIG. 1, for example, in the case where a print direction is received from a user input I/F unit such as a remote control, the coded information rasterization unit 102 selects content to be printed according to the user's direction, and transmits the selected content to the unique information addition unit 104.

The unique information addition unit 104 transmits, to the print content generation unit 108, unique information of the STB 100 which is to be added to the content to be printed. The print content generation unit 108 generates print content described in XML language for printing, using (i) the content to be printed that is received from the coded information rasterization unit 102 and (ii) the unique information received from the unique information addition unit 104.

FIG. 4A, FIG. 4B and FIG. 4C are diagrams respectively showing an example of the print content generated in the print content generation unit 108. FIG. 4A is an example of a file, "honbun.xhtml" in which (i) directions regarding a layout in printing and (ii) a text to be printed are described. FIG. 4B and FIG. 4C respectively show image examples placed according to the layout directed in the above mentioned "honbun.xhtml" (the file names of these images are respectively "mobile1.jpg" and "mobile2.jpg").

The print content I/F unit 109 exchanges print content, print command and the like with the print content I/F unit 151.

The monitor 190 is a device which displays moving images, text and the like based on data received from the STB 100. And, the monitor 190 includes: a display image I/F unit 191; a display image processing unit 192; an image display unit 193; a display control unit 194; and a display control I/F unit 195.

The display image I/F unit 191 communicates image data and the like with the display image I/F unit 106 of the STB 100, and transmits the received image data and the like to the display image processing unit 192. The display image processing unit 192 executes a predetermined process on the received image data and the like, and transmits the processed image data to the image display unit 193.

The image display unit 193 is a display device such as a Cathode Ray Tube (CRT), a Liquid Crystal Display (LCD), a Plasma Display Panel (PDP) and a projector. And, the image display unit 193 displays images based on the image data and the like received from the display image processing unit 192. The display control unit 194 controls each unit of the monitor 190 based on the control data and the like inputted into the display control I/F unit 195.

The printer 150 is a device which prints images and texts on print media based on data received from the STB 100. And the printer 150 includes: a print content I/F unit 151; a content interpretation unit 152; a print image generation unit 153; a print unit 154; and a print control unit 155.

The print content I/F unit 151 exchanges print content, print command and the like with the print content I/F unit 109 of the STB 100.

The print content I/F unit 151 transmits print content received from the print content I/F unit 151 to the content interpretation unit 152. The content interpretation unit 152 sequentially interprets each row described in XML language for printing, and extracts data and the like indicating direction details for the printer 150 in printing. The data interpreted and extracted in the content interpretation unit 152 is transmitted to each unit of the printer 150.

The print image generation unit 153 generates print image data to be printed on print media based on the data extracted in the content interpretation unit 152.

The print unit 154 executes printing on print media such as paper using a predetermined resolution (for example, 200 dpi, 300 dpi or 400 dpi), based on the print image data generated in the print image generation unit 153. As a print method in this case, the following are available: a thermo-sensitive type; a thermal transfer type; a sublimation type; an ink jet printer and the like.

The print control unit 155 is a micro computer including a RAM, a ROM and the like. And, the print control unit 155 controls each unit of the printer 150.

Here, the STB 100, the monitor 190 and the printer 150 are connected to each other by an IEEE1394 bus, a Universal Serial Bus (USB) and the like, and each I/F unit of the devices exchange data according to the connected bus specification.

Next, operations of the image processing system 10 structured as above will be explained.

Figure 2:
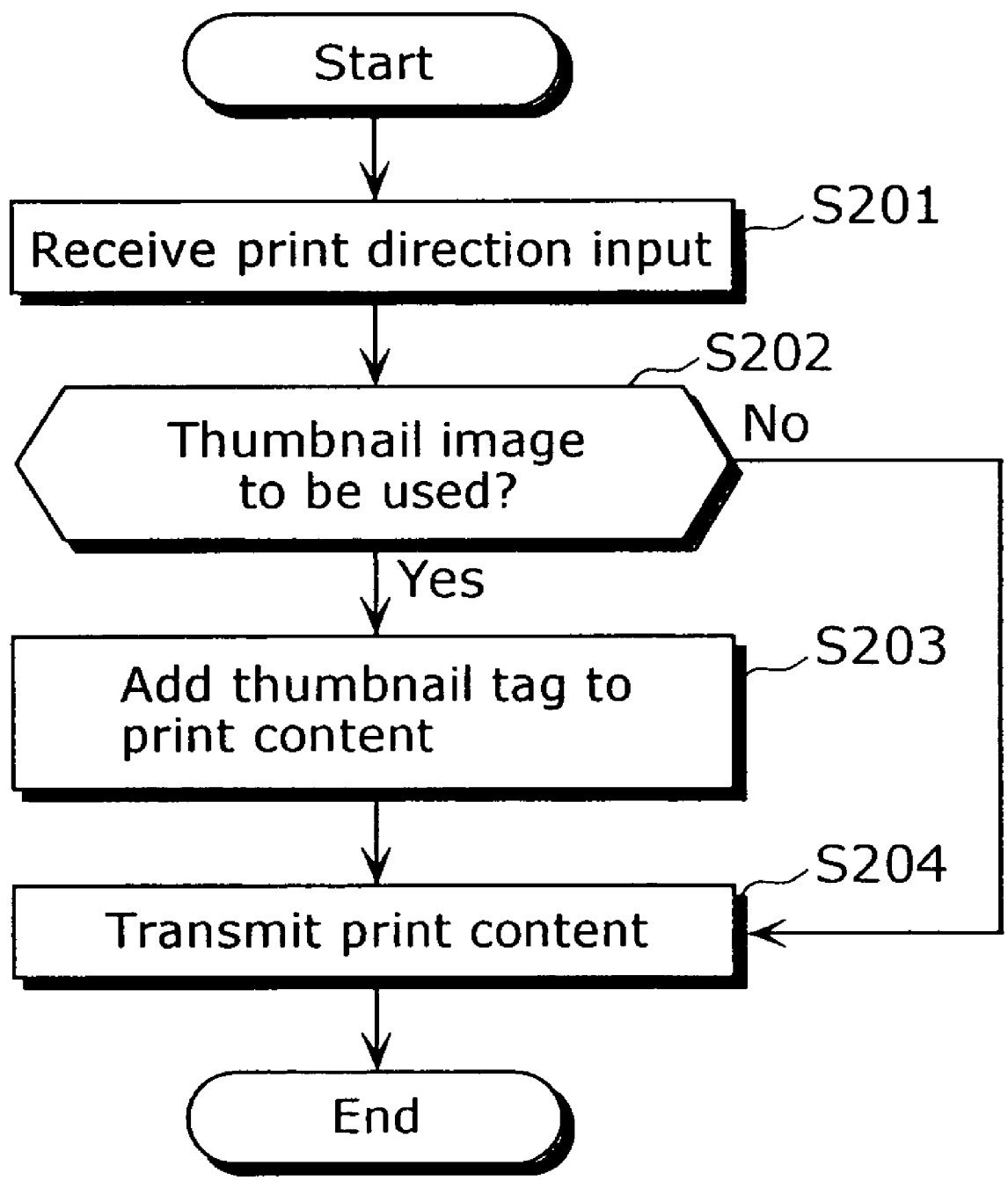
FIG. 2 is a flow chart showing a processing flow of an STB according to the first embodiment.

FIG. 2 is a flow chart showing a processing flow of the STB 100 in the present system 10.

As described above, when the broadcast content is inputted via antenna and the like, the coded information rasterization unit 102 (i) executes a decoding process on data included in the inputted broadcast content, according to the data format, and (ii) extracts a control direction to the STB 100, video and image data, and the like.

Based on the data extracted in the coded information rasterization unit 102, the process control unit 111 transmits the content to the rendering engine unit 103 so as to cause the monitor 190 to display the image. The rendering engine unit 103 stores the image data into the video RAM unit 105.

While the rendering engine unit 103 stores the image data, the process control unit 111 monitors input from a user input I/F unit that is not shown in the drawing. The user input I/F unit may take any form such as: a button or a remote control included in the STB 100 or the printer 150; a part for reading the direction described in the content per se in the STB; a personal computer in the system; a communication reception unit from outside the system, and the like (none of these is not shown in the drawing).

When receiving input from the user input I/F unit (S201), the process control unit 111 notifies the received input to the unique information addition unit 104. Thereby, the unique information addition unit 104 judges whether or not thumbnail image should be used for printing (S202).

Figure 3:
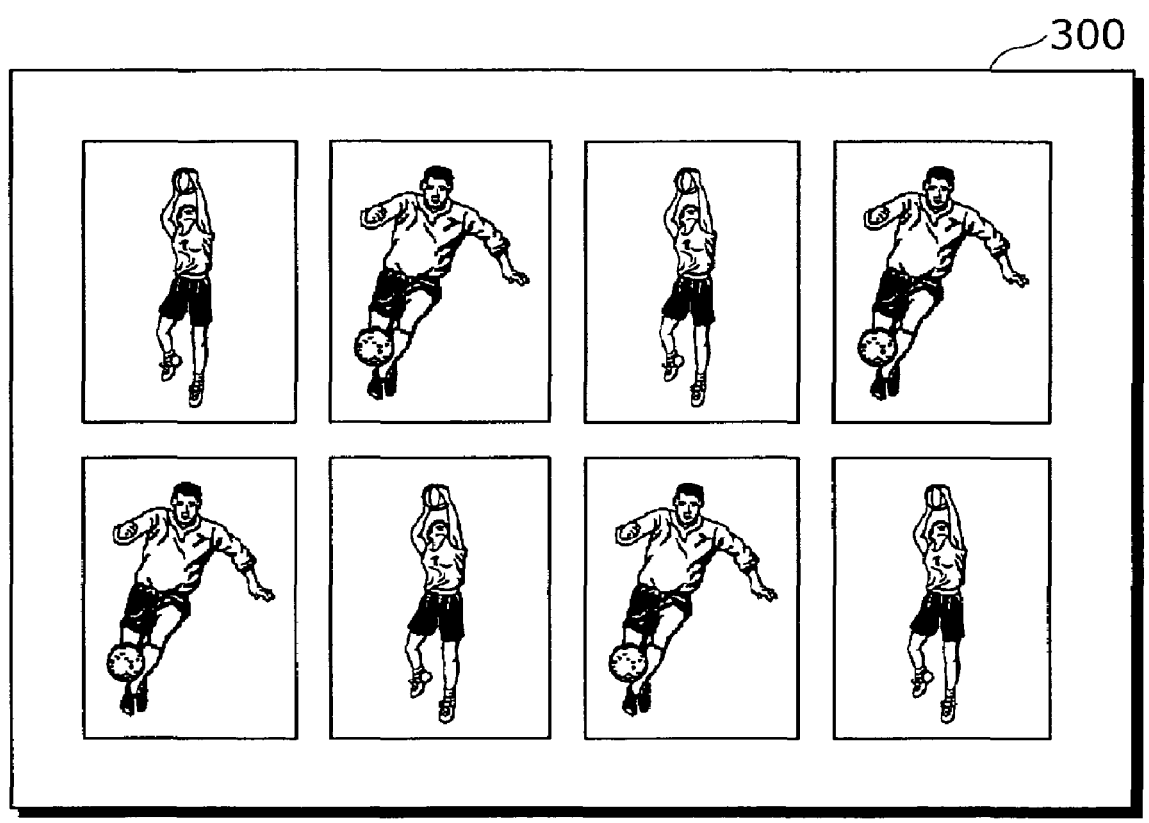
FIG. 3 is a diagram showing a print example of index sheet.

As the above mentioned method for judging "whether or not thumbnail image should be used for printing", there are various methods. For example, in the case where an application for displaying pictures is activated in the STB, and a direction to print a picture index sheet is inputted, as shown in FIG. 3, many small images are printed in the picture index sheet 300. In the case where it is judged that the speed for completing the print should be prioritized over the print quality of the images, it is judged that the thumbnail image should be used. Also, as another example of the judging method, even in the case where the horizontal and vertical size of the image directed to be printed is smaller than the size of the case where the thumbnail image is not miniaturized, it is judged that the thumbnail image should be used. For example, the following case will be considered: it is specified that the print resolution of the printer should be 200 dpi, and the horizontal and vertical size when the image is printed should be "horizontal: 0.4 inches and vertical: 0.3 inches". Since the number of horizontal and vertical pixels is horizontal 1600 pixels× vertical 1200 pixels, for example, in the case where the number of horizontal and vertical pixels of the thumbnail image is horizontal 160 pixels×vertical 120 pixels, when each image is printed using the print resolution, the print size of the main image is "horizontal: 8 inches and vertical: 6 inches", and the print size of the thumbnail image is "horizontal: 0.8 inches and vertical: 0.6 inches". Since the horizontal and vertical size of the print image is specified as "horizontal: 0.4 inches and vertical: 0.3 inches", each thumbnail image needs to be further miniaturized. In this case, the unique information addition unit 104 judges that the thumbnail image should be used.

In the case where the unique information addition unit 104 judges that the thumbnail image should be used (Yes: S202), the print content generation unit 108 additionally describes the direction to use the thumbnail image in the print content (S203). Specifically, as shown in FIG. 4A, between the descriptions specifying the image, <object data="./mobile1.jpg" type="image/jpeg" style="width: 12 mm; height: 16 mm"> and </object>, a direction, <param name="imagepriority" value="thumbnail" valuetype="data"> </param> is inserted. FIG. 5A is an example of print content to which the above direction is added.

As the additional description, in addition to the above mentioned example, there is a method for defining "imagepriority" as the unique attribute of <object> tag. In this case, the description is <object data="./mobile1.jpg" type="image/jpeg" style="width: 12 mm; height: 16 mm" imagepriority="thumbnail">, which means "generating print image data of horizontal 12 mm and vertical 16 mm using the thumbnail image from the file "mobile1.jpg" where JPEG image data has been stored".

After this, the process control unit 111 directs the print content I/F unit 109 to transmit the additionally described content to the printer (S204).

Figure 6:
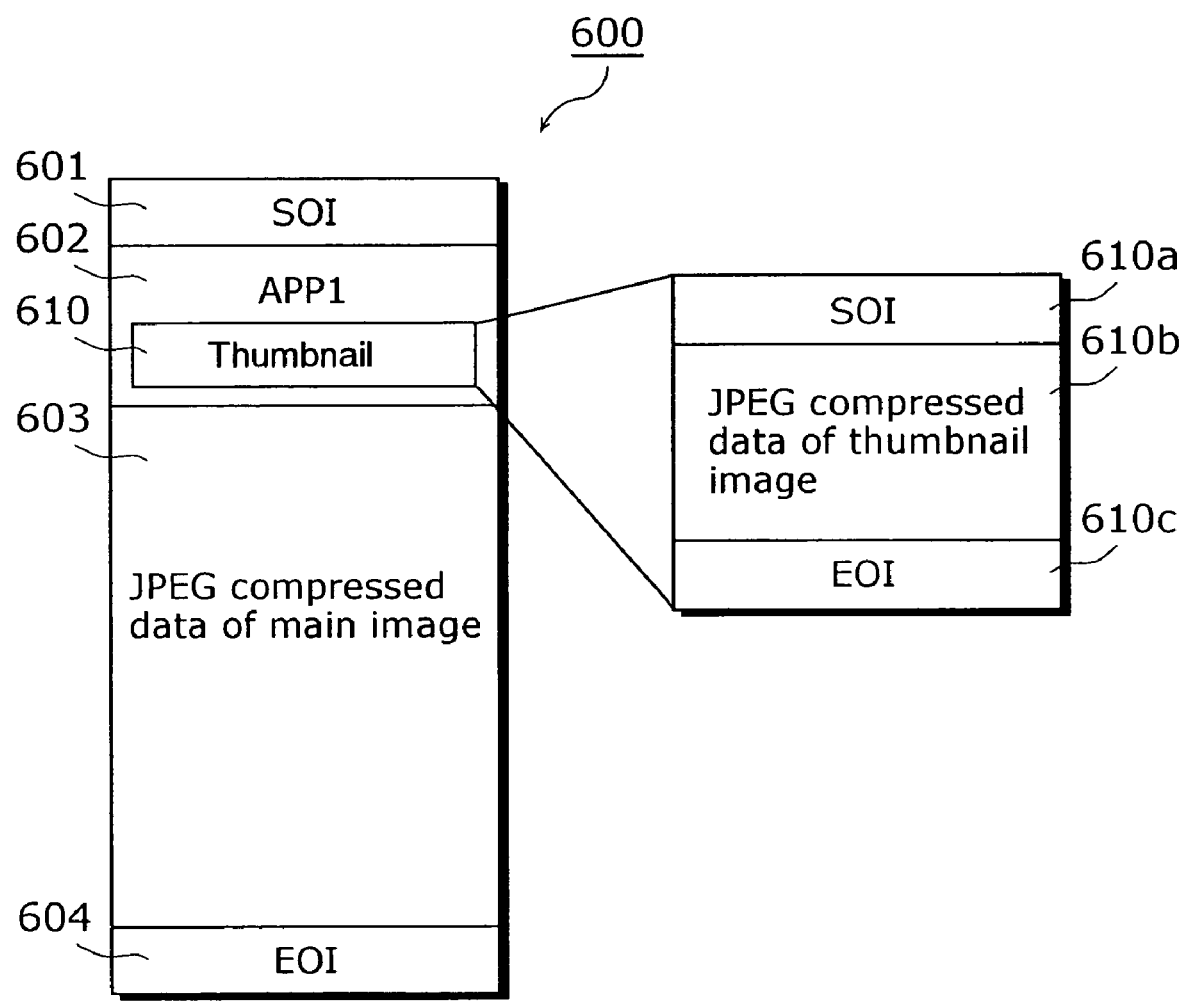
FIG. 6 is a diagram describing an image format of Exif standard.

Here, the format of the image data will be explained referring to FIG. 6.

Generally, an image file 600 of JPEG format according to Exif standard is made up of four parts: a Start Of Image (SOI) 601; an application marker 1 (APP1) 602; a main image 603; and an End Of Image (EOI) 604. Moreover, a thumbnail image 610 defined in the APP1602 is made up of an SOI 610*a*, a thumbnail image 610*b* and an EOI 610*c*. Each of the main image 603 and the thumbnail image 610*b* is compressed.

Figure 7:
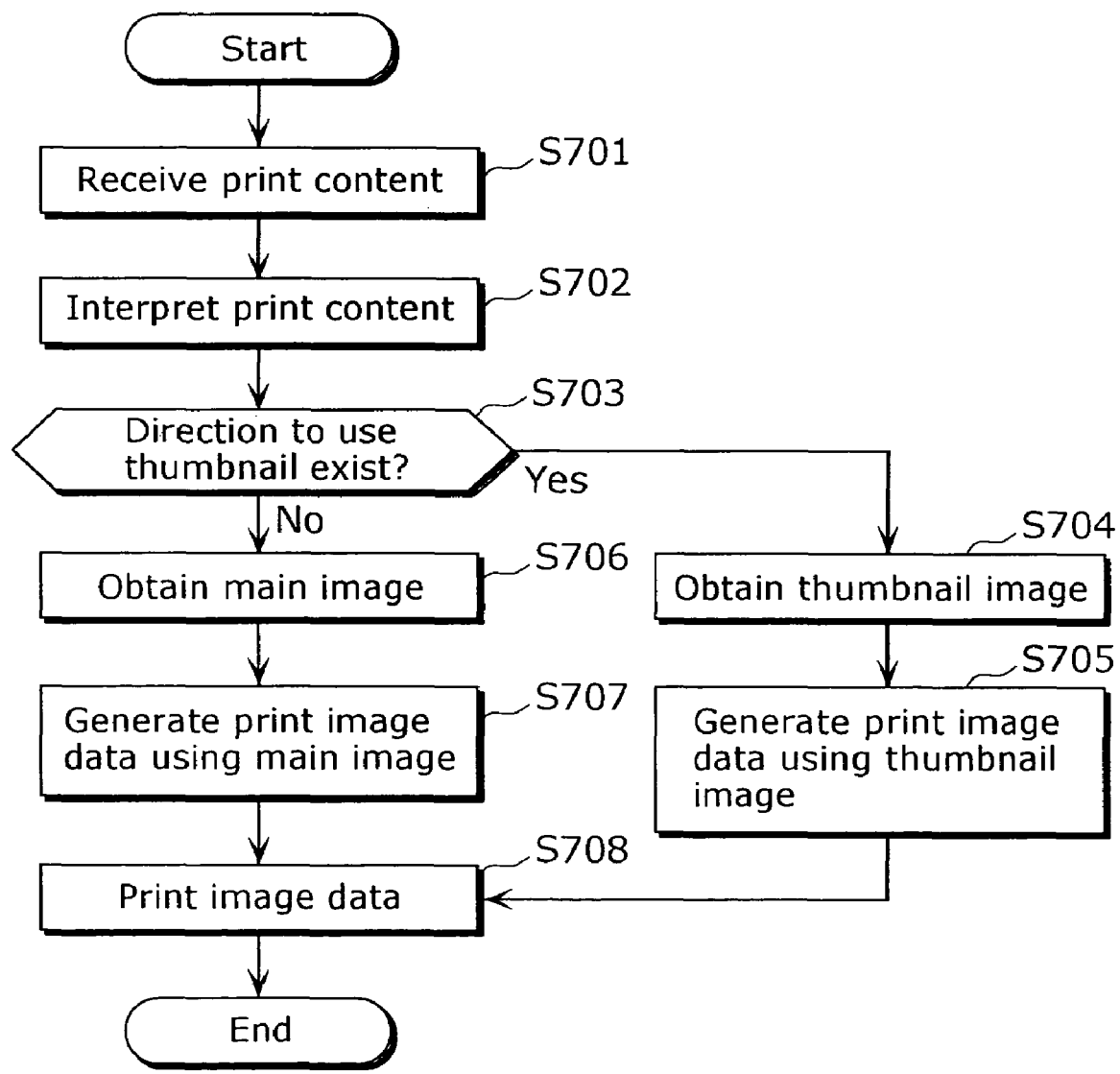
FIG. 7 is a flow chart showing a processing flow of a printer according to the first embodiment.

Next, operations of the printer 150 which receives print content from the STB 100 will be explained according to a flow chart as shown in FIG. 7.

First, when receiving print content via a print content I/F unit 151 (S701), the content interpretation unit 152 starts interpreting the received content (S702). In such interpretation, in the case of discovering a description directing use of the thumbnail image for printing, <param name="imagepriority" value="thumbnail" valuetype="data"> </param> (S703: Yes), the content interpretation unit 152 extracts the JPEG compressed data 610*b* of the thumbnail image from the image file having a structure according to the Exif standard as shown in FIG. 6 (S704).

In addition, the content interpretation unit 152 decodes the extracted JPEG compressed data 610*b* of the thumbnail image, and transmits the decode data to the print image generation unit 153. The print image generation unit 153 generates print image data using the thumbnail image (S705), and transmits the print image data to the print unit 154. Thereby, the print unit 154 executes printing on print media such as paper based on the generated image data for printing (S708).

Figure 8:
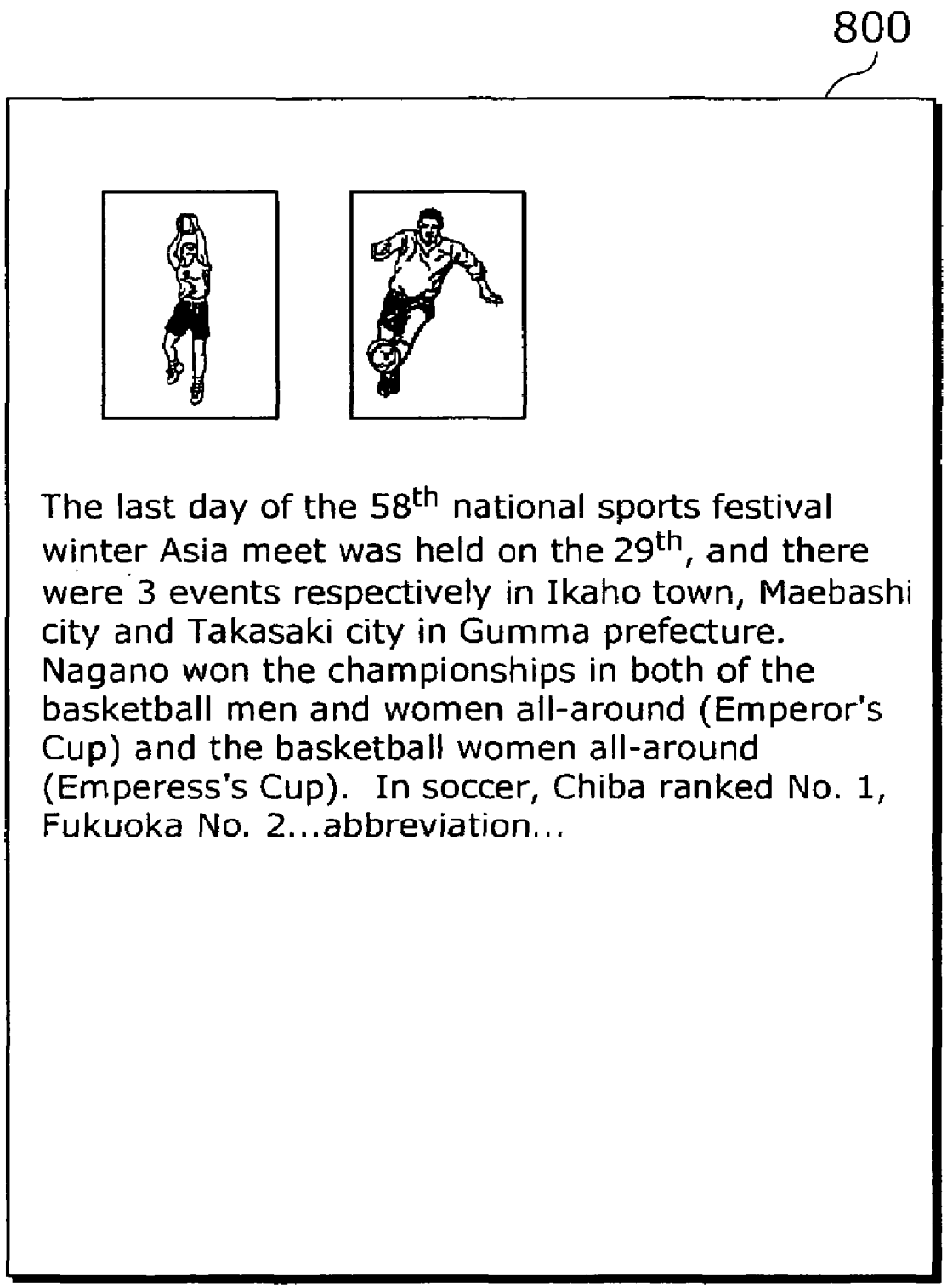
FIG. 8 is a diagram showing an example of a print result in a printer according to the first embodiment.

FIG. 8 is an example of the case where printing is executed using the thumbnail image in the print unit 154. As shown in FIG. 8, the print result 800 includes (i) images made up of thumbnail images and (ii) characters.

As described above, since the size of the thumbnail image (total pixel number) is smaller than the size of the main image, by generating print image using the thumbnail image, processing time can be reduced compared to the case of generating print image using the main image.

Figure 11:
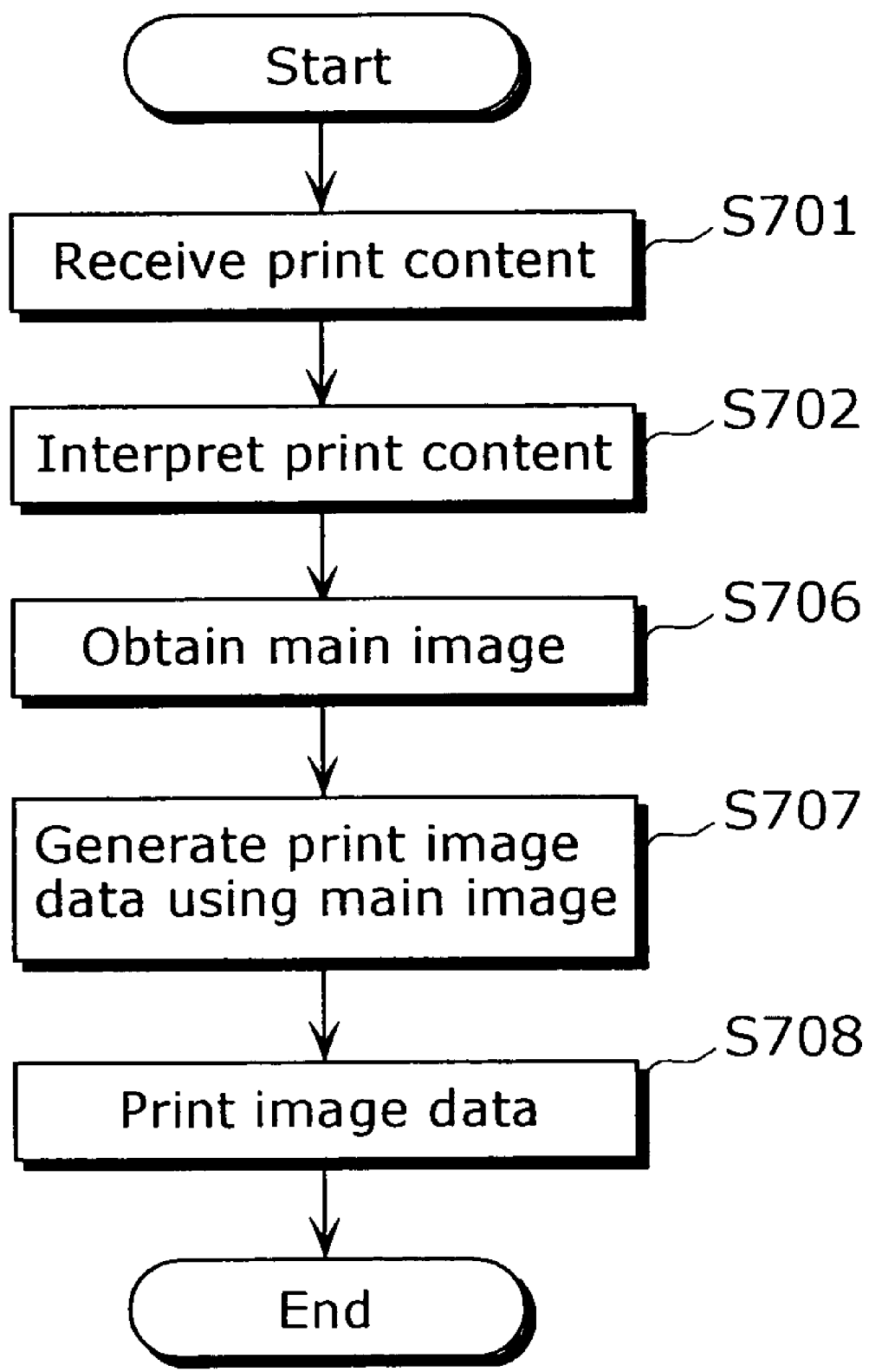
FIG. 11 is a flow chart showing a processing flow in another manufacturer's printer.

Here, for the sake of comparison, operations of a different manufacture's printer will be explained using FIG. 9 and FIG. 11, assuming the case where the content to be printed as shown in FIG. 5 is inputted into the printer (hereinafter, referred to as "another manufacturer's printer") which cannot interpret the "direction to use the thumb nail". In a flow chart of FIG. 11, the same processes as those in the flow chart of FIG. 7 are assigned with the same codes, and the explanation will be omitted.

Another manufacture's printer starts interpreting the print content as shown in FIG. 5 (S702). However, as shown in FIG. 9, another manufacturer's printer cannot interpret descriptions shown with the cancellation lines 900. However, according to the XML specification, the descriptions that cannot be interpreted are ignored. Therefore, another manufacturer's printer ignores the parts shown with the cancellation lines or replaces such parts with default values, and then interprets the following descriptions.

In other words, another manufacturer's printer obtains and generates print image data using not the thumbnail image but the usual main image for generating the print image when a direction to use the thumbnail does not exist (S703: NO, S706, and S707).

FIG. 10 shows a result 1000 of the print image data transferred to paper. In FIG. 10 the same print product is generated as in FIG. 8. However, the main image whose size (total pixel number) is larger than the thumbnail image is used for the printed image part. Thereby, the time spent for the process of generating the print image is longer than the present printer 150 including the content interpretation unit 152 that can interpret the direction to use the thumbnail image.

As described above, according to the print system of the present embodiment, depending on the image to be printed, the "direction to use thumbnail image" predetermined in the XML format is notified to the printer. Therefore, while occurrence of abnormal operation when printing is prevented, the print speed can be accelerated.

Second Embodiment

In the above mentioned first embodiment, an embodiment example of additionally describing the "direction to use thumbnail image" into the print content is explained. In the present embodiment, the following embodiment example will be explained: "direction to print the same details as the display details" or "direction to print the print specific content" are additionally described into the print content.

Generally, there are two types of print contents: one is print content (hereinafter referred to as "display limited content") limited to the same details as the details displayed on a screen (also called "monitor"); and another is print content (hereinafter referred to as "print specific content") that is specifically for printing and not displayed on the screen.

Figure 12:
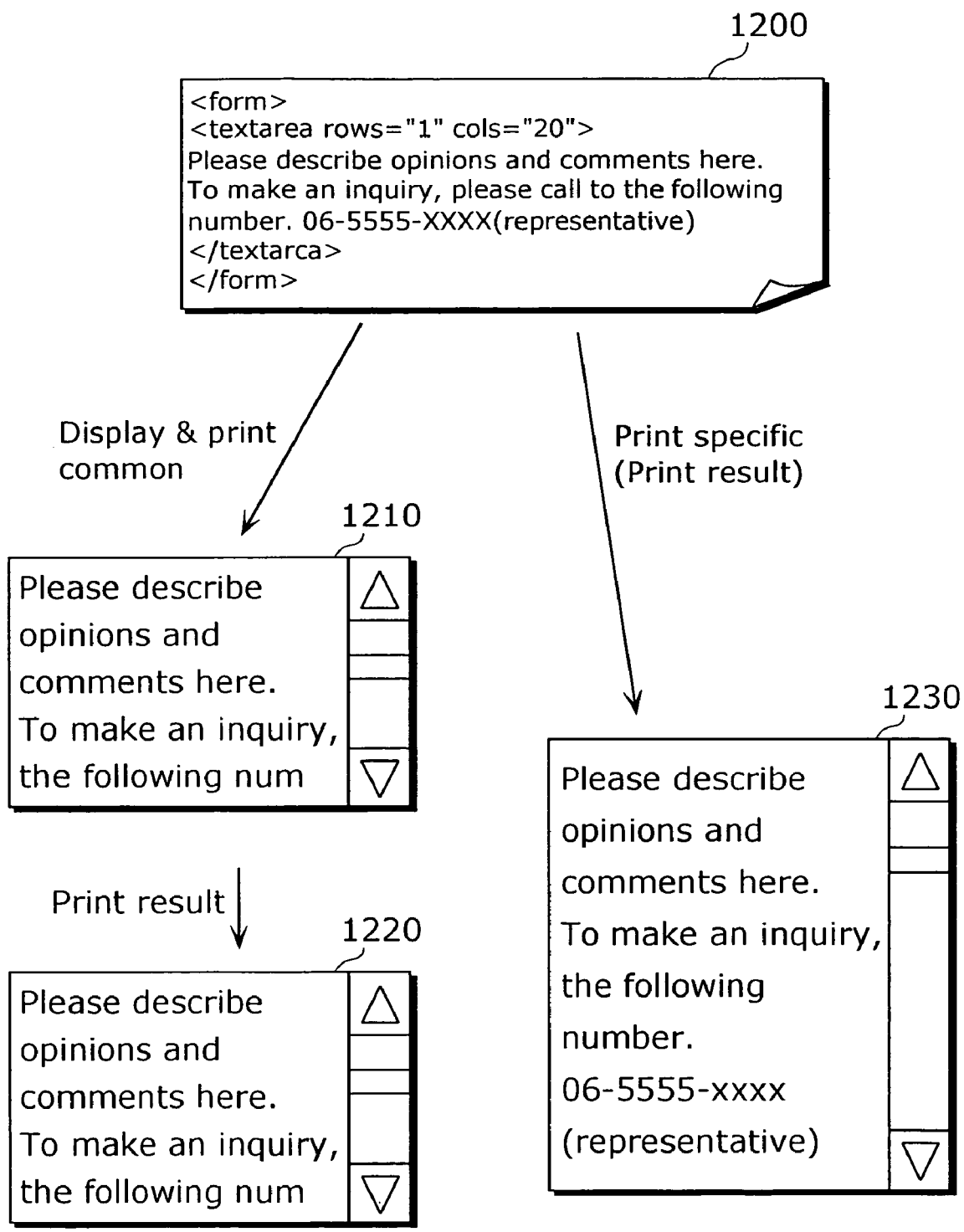
FIG. 12 is a diagram showing (i) content display and (ii) how the content is described in printing, the content being described using form element.

FIG. 12 is a diagram for explaining the difference in print operations in the case where a print direction is provided to two types of print contents described using form element 1200.

First, in the case where a print direction is provided for the display limited content, the same details as the details displayed on the screen 1210 are printed 1220 (in this case, it is considered that the user executes printing so as to save the image displayed on the screen).

FIG. 12 shows how text details described using "textarea" element are described on the screen or print medium. On the screen, in the case where there is a scroll bar, not all of the text details are displayed. Thus, in the case where printing is directed for the display limited content, not all of the text details are printed on the print medium, and the same details as the display on the screen are printed, the details being a part of the text details corresponding to the position of the scroll bar.

On the other hand, in the case where printing is directed for the print specific content which is not displayed on the screen, all of the content is printed 1230.

In such case as described above, when only a part of the text details is printed, the user cannot see the details of the part which is not printed. This is extremely inconvenient for the user compared to the case where the same details are printed as the details on the screen. Thus, it is assumed that all of the print specific content is printed in the case of printing the print specific content.

Figure 13:
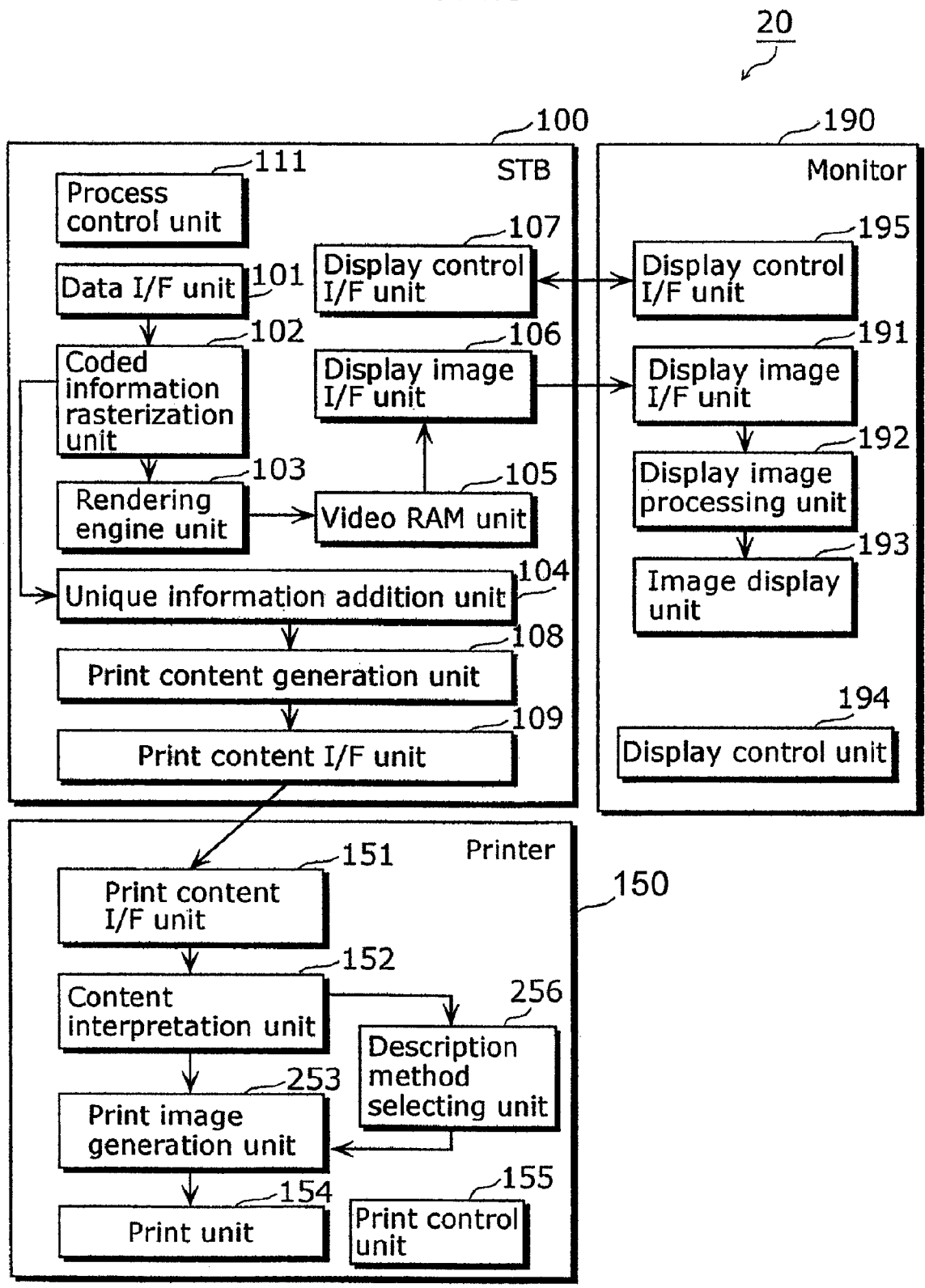
FIG. 13 is a block diagram showing a functional structure of an image processing system according to the second embodiment.

FIG. 13 shows a functional structure of an image processing system (also called "print system") according to the present embodiment which realizes the above mentioned function. In FIG. 13 the same functional structure as FIG. 1 is assigned with the same codes, and the explanation will be omitted.

A unique information addition unit 104 judges whether print content to be transmitted to a printer 150 is display limited content or print specific content. There are various judging methods in this case. As an example, in the case where the display limited content displayed on the monitor is printed, print content is generated based on the display content. In this case, the judgment is based on generating the print content. As another example, in the case where a file name of print content and a file name of displayed content are compared, when the two file names match, it is judged that the display limited content is to be printed. The result judged in the unique information addition unit 104 is reflected on the description in the print content generated in the print content generation unit 108.

The description method selecting unit 256 in the printer 150 selects a description method in the printer 150 based on the judgment in the STB 100 extracted in the content interpretation unit 152. The selected description method is reflected on the print image data generated in the print image generation unit 253.

Figure 14:
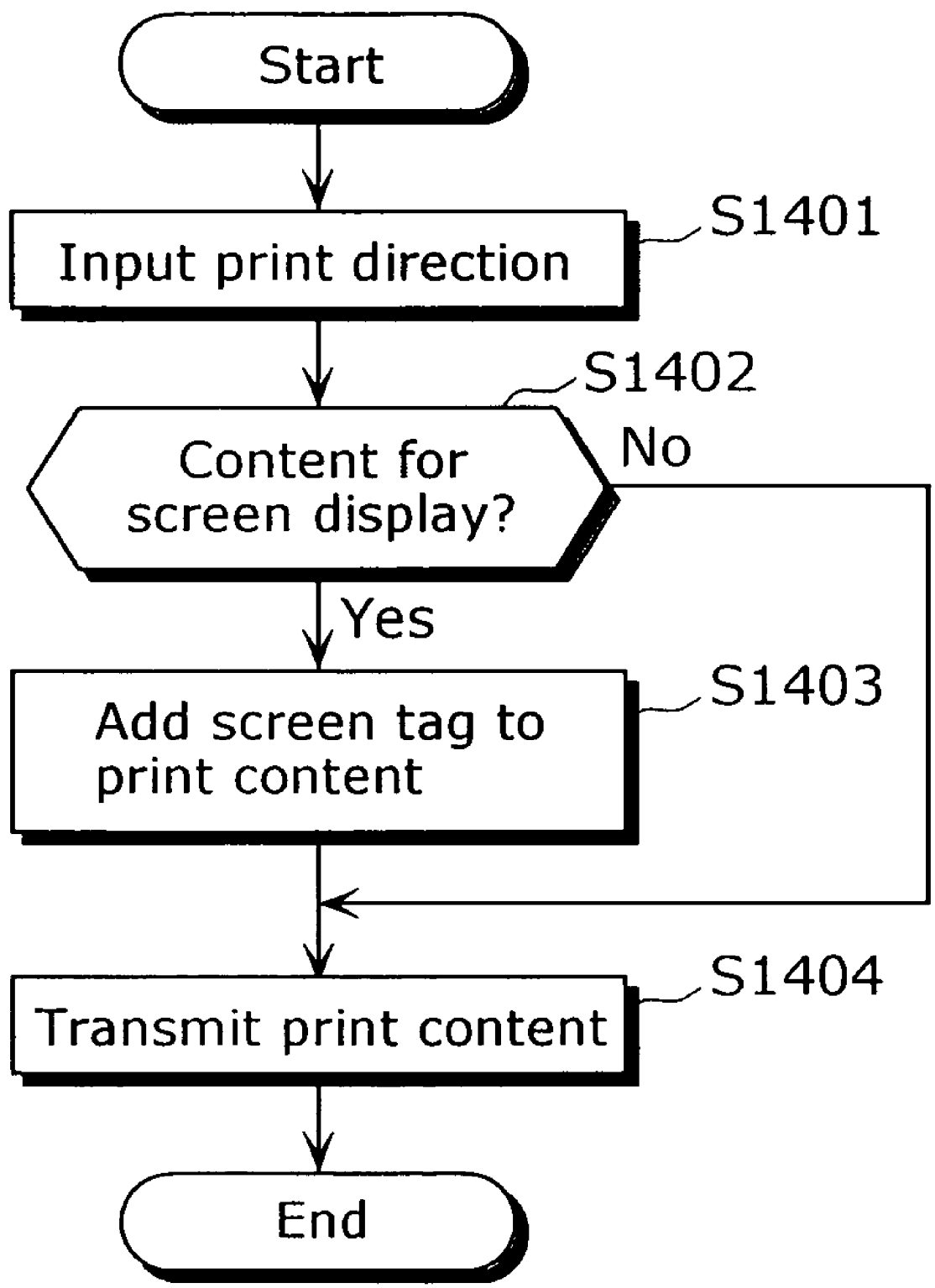
FIG. 14 is a flow chart showing a processing flow of an STB according to the second embodiment.

Next, operations of the image processing system 20 structured as described above will be explained. FIG. 14 is a flow chart showing a processing flow in the STB 100 of the image processing system 20.

First, when the print direction is received from the user (S1401), the unique information addition unit 104 judges whether the print content is display limited content or print specific content (S1402).

When the print content is display limited content, the unique information addition unit 104 adds, to the print content, a description indicating the display limited content (S1403). Specifically, as shown in FIG. 15A, a description, <meta name="display-target" content="screen"/> is inserted between <head> and </head>. It is assumed that the STB 100 and the printer 250 agree on, in advance, that the above mentioned description indicates the display limited content. After the above description is added, the STB 100 transmits the print content to the printer 150 (S1404).

On the other hand, in the case where the print content is print specific content, the unique information addition unit 104 adds, to the print content, a description indicating the print specific content. Specifically, as shown in FIG. 15B, a description, <meta name="display-target" content="print"/> is inserted between <head> and </head>.

In the case where the print content can be distinguished as the display limited content, the print content can be transmitted to the printer 150 (S1404) without adding any descriptions.

Figure 16:
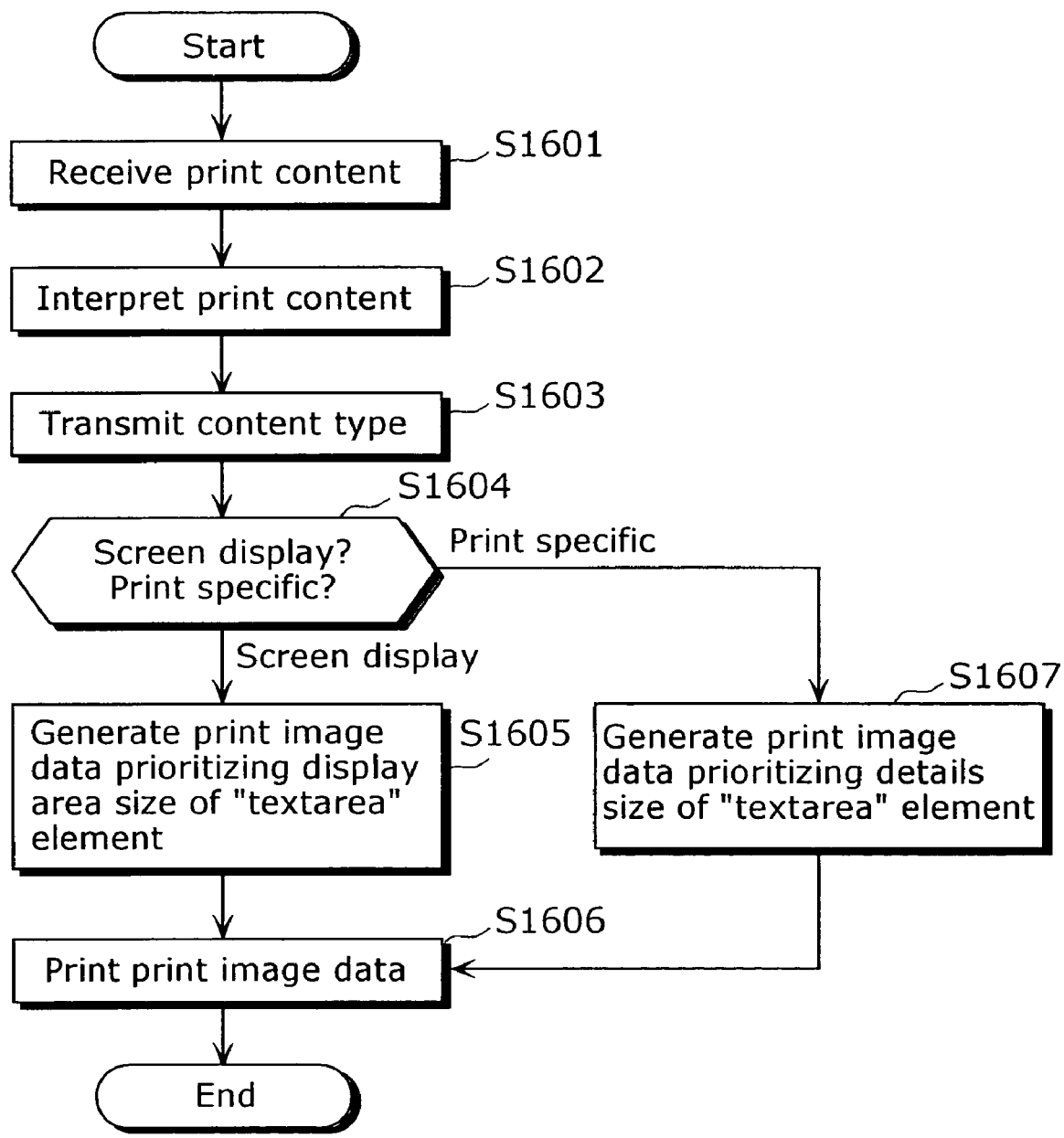
FIG. 16 is a flow chart showing a processing flow of a printer according to the second embodiment.

FIG. 16 is a flow chart showing a processing flow in the printer 250 of the image processing system 20. When receiving the content to be printed (S1601), the content interpretation unit 152 of the printer 250 interprets the description of the content to be printed (S1602). When discovering, in the above mentioned description, a description such as information indicating the type of the content to be printed, <meta name="display-target" content="screen"/>, the content interpretation unit 152 transmits information indicating the type to the description method selecting unit 256 (S1603).

Figure 17A:
FIG. 17 are diagrams respectively showing an example of a print result in a printer according to the second embodiment.

Next, the description method selecting unit 256 selects generation algorithm of print image data in the print image generation unit 253 based on the received information indicating the type of the content to be printed (S1604). Specifically, as shown in FIG. 15A, in the case where there is a description, <meta name="display-target" content="screen"/> in the content to be printed, which means that the content is display limited content, the description method selecting unit 256 selects generation algorithm of print image data used for printing "textarea" element details, the textra element details being the same as the display on the monitor (S1604: screen display). As a result, the print image generation unit 153 generates print image data, as shown in FIG. 17A, for which a display area size of the "textarea" element is prioritized (S1605), and prints the generated print image data on print media (S1606).

Figure 17B:

On the other hand, in the case where the description as shown in FIG. 15B is print specific content, the description method selecting unit 156 selects generation algorithm of print image data for print specific content (step S1604: print specific), and generates print image data, as shown in FIG. 17B, for which print size of "textarea" element details is prioritized (S1607).

As described above, according to the image processing system of the present embodiment, it is possible to specify "direction to print the same details as display details" or "direction to print the print specific content". Thus, it is possible to select a description method in the print result.

Third Embodiment

According to the present embodiment, a method for using an XML tag will be explained, the XML tag being different from the XML tag described in the above mentioned embodiments. The image processing system 30 according to the present embodiment is basically the same as the image processing system 10 according to the first embodiment, thus the explanation about the same functional structure will be omitted here.

FIG. 18 is an example of special tag based on the XML specification according to the present embodiment. FIG. 18A is an example of special tag attributes showing "colorspace", "content-width" and "content-height".

"Colorspace" is an attribute for defining color space of image. Because of this attribute, the printer which has received print content can accurately grasp color space. And, the color space can be reflected on the print result. As specific attribute values, there are "hc-srgp" and the like as shown in FIG. 18A.

"content-width" and "content-height" are attributes which define dot width and dot height of an image. Because of these attributes, the printer which has received print content can grasp a horizontal and vertical size of image without analyzing image header. Specifically, the printer specifies image size according to "content-width="80 px"" and the like. In the case where image size is not described in the print content when printing an image, the printer analyzes image header, and extracts number of horizontal and vertical pixels originally included in an image. And, the printer must calculate the size for printing based on the pixel number. However, in the case where "content-width" and "content-height" are described, without analyzing image header used for printing, the size for printing can be calculated using the described number. Thus, time and function which are necessary for analyzing image header can be omitted. Here, the horizontal and vertical size of image may be specified using not "dot" but length (for example, "mm"). Also, FIG. 18B is an example of meta information name "content-kind" for specifying content kind.

For example, by adding a description, "content-kind="photo-print"", to a part of print content, it is possible to notify the printer that the kind of the image is "picture".

As described above, according to the image processing system 30 of the present embodiment, it is possible to accurately notify, from the STB to the printer, color space of image, horizontal and vertical size of image and kind of content.

In the first, second and third embodiments, XML is described as a markup language which can interpret the tag and the like specified by the user. However, the markup language is not limited to XML, and may be other languages than XML, as long as the languages can interpret the tag and the like specified by the user.

The present invention can be applied to an STB (or a digital TV and the like having an STB function) and to a print system including a print device. In particular, the present invention can be applied to a print system in which XML and the like can be interpreted.

The invention claimed is:

1. A print content transmission device that transmits print content to a print device, the print content transmission device comprising:
   a content procurement unit configured for at least one of obtaining print content and generating the print content, the print content being described using a predetermined markup language;
   a feature identification unit operable to identify a feature of the print content;
   an addition unit operable to describe the identified feature as a definition statement that includes a uniquely defined tag that can be handled in the markup language and that indicates whether thumbnail image data should be printed with the print content, and to add the definition statement to the print content; and
   a transmission unit operable to transmit the print content including the added definition statement to the print device,
   wherein said feature identification unit is operable to judge whether or not the print content is content for which thumbnail image data should be used when the print content is printed,
   wherein, when said feature identification unit judges that the print content is content for which the thumbnail image data should be used, said addition unit is operable to add, to the print content, the definition statement to indicate that the thumbnail image data should be used,
   wherein said addition unit is operable to add, to the print content, the definition statement indicating that the thumbnail image data should be used, the definition statement being added to the print content using the uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and
   wherein the definition statement, which is added to the print content by said addition unit and indicates that the thumbnail image data should be used, is ignored by another print device because the definition statement, which is added to the print content by said addition unit and indicates that the thumbnail image data should be used, cannot be interpreted by the another print device.

2. The print content transmission device according to claim 1, wherein said feature identification unit is operable to judge that the print content is content for which the thumbnail image data should be used when the print content includes an index sheet.

3. The print content transmission device according to claim 1,
wherein said feature identification unit is operable to judge whether or not a print size is described in the print content when an image is printed, and
wherein, when it is judged that the print size is not described in the print content, said addition unit is operable to add, to the print content, the definition statement to indicate a number of horizontal and vertical pixels.

4. The print content transmission device according to claim 1,
wherein said feature identification unit is operable to judge whether or not the print content is content displayed on a screen or print specific content, and
wherein said addition unit is operable to add, to the print content, the definition statement to indicate whether or not the print content is content displayed on the screen or print specific content.

5. The print content transmission device according to claim 1,
wherein said feature identification unit is operable to identify a kind of the print content, and
wherein said addition unit is operable to add, to the print content, the definition statement to indicate the kind of the print content.

6. The print content transmission device according to claim 1, wherein the markup language is an Extensible Markup Language (XML).

7. A print device for receiving print content from a print content transmission device including (i) a content procurement unit configured for at least one of obtaining print content and generating the print content, the print content being described using a predetermined markup language, (ii) a feature identification unit operable to identify a feature of the print content, (iii) an addition unit operable to describe the identified feature as a definition statement that includes a uniquely defined tag that can be handled in the markup language and that indicates whether thumbnail image data should be printed with the print content, and to add the definition statement to the print content, and (iv) a transmission unit operable to transmit the print content including the added definition statement to the print device, wherein the feature identification unit is operable to judge whether or not the print content is content for which thumbnail image data should be used when the print content is printed, wherein, when the feature identification unit judges that the print content is content for which the thumbnail image data should be used, the addition unit is operable to add, to the print content, the definition statement to indicate that the thumbnail image data should be used, wherein the addition unit is operable to add, to the print content, the definition statement indicating that the thumbnail image data should be used, the definition statement being added to the print content using the uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and wherein the definition statement, which is added to the print content by the addition unit and indicates that the thumbnail image data should be used, is ignored by another print device because the definition statement, which is added to the print content by the addition unit and indicates that the thumbnail image data should be used, cannot be interpreted by the another print device, said print device comprising:

a reception unit operable to receive the print content described using the predetermined markup language;
an extraction unit operable to extract, from the received print content, the definition statement including the uniquely defined tag; and
a print unit operable to generate print image data based on the extracted definition statement, and to execute printing using the print image data.

8. The print device according to claim 7,
wherein the extracted definition statement includes a tag indicating that the thumbnail image data should be used based on the definition statement, and
wherein said print unit is operable to generate print image data using the thumbnail image data based on the definition statement.

9. The print device according to claim 8, further comprising an obtainment unit operable to obtain only the thumbnail image data from the print content,
wherein said print unit is operable to generate print image data using the obtained thumbnail image data.

10. The print device according to claim 7,
wherein the extracted definition statement indicates a number of horizontal and vertical pixels of an image, and
wherein said print unit is operable to read, from the definition statement, and determine a horizontal and vertical size of an image to be printed when generating the print image data.

11. The print device according to claim 7, wherein said print unit is operable to generate print image data using a same generation algorithm as an algorithm used for a screen display.

12. The print device according to claim 11, wherein said print unit is operable to generate the print image data using an algorithm, by which a size of a "textarea" element display area is prioritized over a size of "textarea" element details.

13. The print device according to claim 11, wherein said print unit is operable to generate the print image data using a generation algorithm, by which a size of "textarea" element details is prioritized over a size of a "textarea" element display area.

14. The print device according to claim 7, wherein the markup language is an Extensible Markup Language (XML).

15. A print system comprising:
a print device; and
a print content transmission device that transmits print content to said print device,
wherein said print content transmission device includes:
a content procurement unit configured for at least one of obtaining print content and generating the print content, the print content being described using a predetermined markup language;
a feature identification unit operable to identify a feature of the print content;
an addition unit operable to describe the identified feature as a definition statement that includes a uniquely defined tag that can be handled in the markup language and that indicates whether thumbnail image data should be printed with the print content, and to add the definition statement to the print content; and
a transmission unit operable to transmit the print content including the added definition statement to the print device,
wherein said feature identification unit is operable to judge whether or not the print content is content for which thumbnail image data should be used when the print content is printed, wherein, when said feature identification unit judges that the print content is content for which the thumbnail image data should be used, said addition unit is operable to add, to the print content, the definition statement to indicate that the thumbnail image data should be used, wherein said addition unit is operable to add, to the print content, the definition statement indicating that the thumbnail image data should be used, the definition statement being added to the print content using a uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, wherein the definition statement, which is added to the print content by said addition unit and indicates that the thumbnail image data should be used, is ignored by another print device because the definition statement, which is added to the print content by said addition unit and indicates that the thumbnail image data should be used, cannot be interpreted by the another print device, and wherein said print device includes:
   a reception unit operable to receive the print content from said print content transmission device;
   an extraction unit operable to extract, from the received print content, the definition statement including the uniquely defined tag; and
   a print unit operable to generate print image data based on the extracted definition statement, and to execute printing using the print image data.

16. The print system according to claim 15, wherein the markup language is an Extensible Markup Language (XML).

17. A print content transmission method for transmitting print content to a print device, said print content transmission method comprising:
   a content procurement step of at least one of obtaining print content and generating the print content, the print content being described using a predetermined markup language;
   a feature identification step of identifying a feature of the print content;
   an addition step of describing the identified feature as a definition statement that includes a uniquely defined tag that can be handled in the markup language and that indicates whether thumbnail image data should be printed with the print content, and adding the definition statement to the print content; and
   a transmission step of transmitting the print content including the added definition statement to the print device, wherein said feature identification step judges whether or not the print content is content for which thumbnail image data should be used when the print content is printed, wherein, when said feature identification step judges that the print content is content for which the thumbnail image data should be used, said addition step adds, to the print content, the definition statement to indicate that the thumbnail image data should be used, wherein said addition step adds, to the print content, the definition statement indicating that the thumbnail image data should be used, the definition statement being added to the print content using a uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and wherein the definition statement, which is added to the print content by said addition step and indicates that the thumbnail image data should be used, is ignored by another print device because the definition statement, which is added to the print content by said addition step and indicates that the thumbnail image data should be used, cannot be interpreted by the another print device.

18. The print content transmission method according to claim 17, wherein the markup language is an Extensible Markup Language (XML).

19. A print method for receiving print content from a print content transmission device including (i) a content procurement unit configured for at least one of obtaining print content and generating the print content, the print content being described using a predetermined markup language, (ii) a feature identification unit operable to identify a feature of the print content, (iii) an addition unit operable to describe the identified feature as a definition statement that includes a uniquely defined tag that can be handled in the markup language and that indicates whether thumbnail image data should be printed with the print content, and to add the definition statement to the print content, and (iv) a transmission unit operable to transmit the print content including the added definition statement to a print device, wherein the feature identification unit is operable to judge whether or not the print content is content for which thumbnail image data should be used when the print content is printed, wherein, when the feature identification unit judges that the print content is content for which the thumbnail image data should be used, the addition unit is operable to add, to the print content, the definition statement to indicate that the thumbnail image data should be used, wherein the addition unit is operable to add, to the print content, the definition statement indicating that the thumbnail image data should be used, the definition statement being added to the print content using a uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and wherein the definition statement, which is added to the print content by the addition unit and indicates that the thumbnail image data should be used, is ignored by another print device because the definition statement, which is added to the print content by the addition unit and indicates that the thumbnail image data should be used, cannot be interpreted by the another print device, said printing method comprising:
   a reception step of receiving the print content described using the predetermined markup language;
   an extraction step of extracting, from the received print content, the definition statement including the uniquely defined tag; and
   a print step of generating print image data based on the extracted definition statement, and executing printing using the print image data.

20. The print method according to claim 19, wherein the markup language is an Extensible Markup Language (XML).

21. A computer-readable storage medium having a program stored thereon, the program causing a print content transmission device to transmit print content to a print device, and the program causing the print content transmission device to execute a method comprising:

a content procurement step of at least one of obtaining print content and generating the print content, the print content being described using a predetermined markup language;

a feature identification step of identifying a feature of the print content;

an addition step of describing the identified feature as a definition statement that includes a uniquely defined tag that can be handled in the markup language and that indicates whether thumbnail image data should be printed with the print content, and adding the definition statement to the print content; and a transmission step of transmitting the print content including the added definition statement to the print device, wherein said feature identification step judges whether or not the print content is content for which thumbnail image data should be used when the print content is printed, wherein, when said feature identification step judges that the print content is content for which the thumbnail image data should be used, said addition step adds, to the print content, the definition statement to indicate that the thumbnail image data should be used, wherein said addition step adds, to the print content, the definition statement indicating that the thumbnail image data should be used, the definition statement being added to the print content using a uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and wherein the definition statement, which is added to the print content by said addition step and indicates that the thumbnail image data should be used, is ignored by another print device because the definition statement, which is added to the print content by said addition step and indicates that the thumbnail image data should be used, cannot be interpreted by the another print device.

22. The computer-readable storage medium according to claim 21, wherein the markup language is an Extensible Markup Language (XML).

23. A computer-readable storage medium having a program for a print device stored thereon, the print device for receiving print content from a print content transmission device including (i) a content procurement unit configured for at least one of obtaining print content and generating the print content, the print content being described using a predetermined markup language, (ii) a feature identification unit operable to identify a feature of the print content, (iii) an addition unit operable to describe the identified feature as a definition statement that includes a uniquely defined tag that can be handled in the markup language and that indicates whether thumbnail image data should be printed with the print content, and to add the definition statement to the print content, and (iv) a transmission unit operable to transmit the print content including the added definition statement to the print device, wherein the feature identification unit is operable to judge whether or not the print content is content for which thumbnail image data should be used when the print content is printed, wherein, when the feature identification unit judges that the print content is content for which the thumbnail image data should be used, the addition unit is operable to add, to the print content, the definition statement to indicate that the thumbnail image data should be used, wherein the addition unit is operable to add, to the print content, the definition statement indicating that the thumbnail image data should be used, the definition statement being added to the print content using a uniquely defined tag and a uniquely defined definition statement in which the uniquely defined tag is used, the uniquely defined tag and the uniquely defined definition statement together forming the definition statement and being in conformance with a specification of a same markup language as the markup language used to describe the print content, and wherein the definition statement, which is added to the print content by the addition unit and indicates that the thumbnail image data should be used, is ignored by another print device because the definition statement, which is added to the print content by the addition unit and indicates that the thumbnail image data should be used, cannot be interpreted by the another print device, the program causing the print device to execute a method comprising:

a reception step of receiving the print content described using the predetermined markup language;

an extraction step of extracting, from the received print content, the definition statement including the uniquely defined tag; and a print step of generating print image data based on the extracted definition statement, and executing printing using the print image data.

24. The computer-readable storage medium according to claim 23, wherein the markup language is an Extensible Markup Language (XML).

* * * * *